June 20, 1961 A. M. GOODLOE 2,989,145

EXPANDED SHEET MATERIAL

Filed Dec. 20, 1957 3 Sheets-Sheet 1

INVENTOR.
Alfred M. Goodloe,
BY Richards and Geier,
Attorneys

INVENTOR.
Alfred M. Goodloe,
BY Richards and Cifelli,
Attorneys

EXPANDED SHEET MATERIAL
Filed Dec. 20, 1957 3 Sheets-Sheet 3
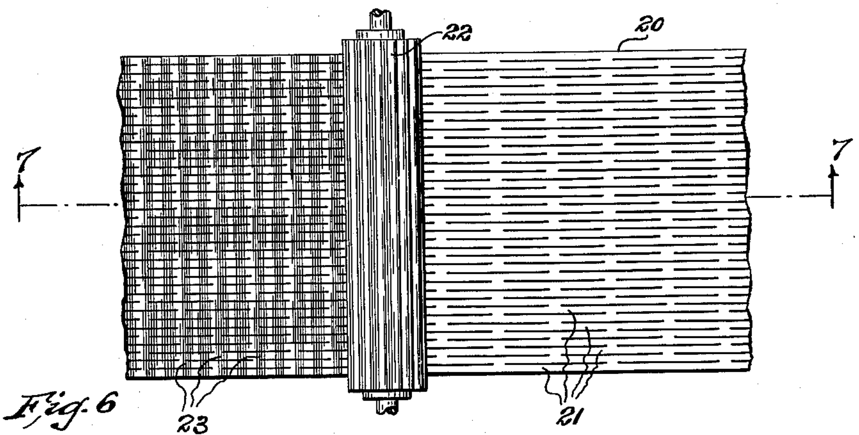
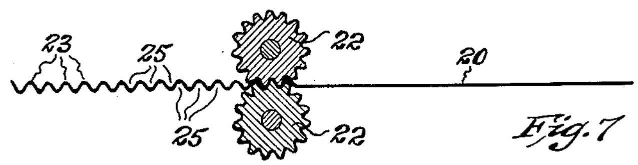
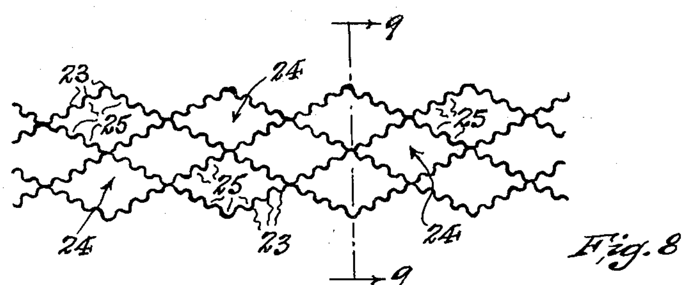
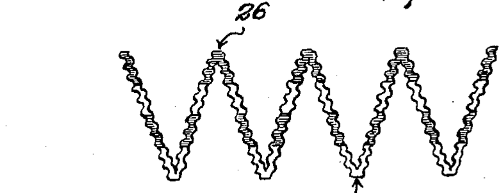
INVENTOR.
Alfred M. Goodloe,
BY Richards and Cifelli,
Attorneys United States Patent Office 2,989,145

Patented June 20, 1961

2,989,145

EXPANDED SHEET MATERIAL

Alfred M. Goodloe, Westfield, N.J., assignor to Metal Textile Corporation, Roselle, N.J., a corporation of Delaware Filed Dec. 20, 1957, Ser. No. 704,035

5 Claims. (Cl. 183—71)

This invention relates to a novel form of expanded sheet material and method of producing same; the material being especially adapted for use in air filters or cleaners as a filter medium providing a multiplicity of spaced apart air impingement surfaces adapted to be coated with a viscous liquid, such as oil or the like, whereby to trap dust particles entrained in an air stream traversing the medium, and thus removing the dust from said air stream; said filter medium being adapted to form a maze or labyrinth of tortuous paths which divide and reunite the air stream flowing through the filter or cleaner, so as to cause the air stream to traverse the impingement surfaces, whereby to separatingly deposit dust content thereon. This application is a continuation in part of my co-pending application for Letters Patent Ser. No. 669,752, filed July 3, 1957, and now abandoned.

Heretofore some air filters or cleaners of the above characterized type have included superposed slitted metallic sheets, which sheets have each been expanded by laterally stretching the same horizontally, i.e. in a plane parallel to the initial flat plane of the sheet. Such horizontal stretching of the sheets results in a structural formation similar to that commonly known as expanded metal lath. When such type of thus expanded sheets have been used in air filters or cleaners, a plurality of the same have been superposed, and supported with their face planes perpendicular or at a right angle to the direction of air flow through the filter or cleaner provided thereby. Due however to the horizontal stretching of the sheets, the impingement surfaces, formed by the narrow sections of metal which define the openings in the expanded sheet, are disposed to lie more or less parallel to the direction of air movement through the sheets, with the result that efficient impingement of air upon such disposed sections is greatly reduced, and consequently desired dust trapping and separating effect is substantially diminished, so that an appreciable percentage of dust remains in the air discharged from the filter or cleaner device.

Having the above in view, it is an object of this invention to provide a novel form of air filter or cleaner medium comprising slitted sheet metal to which expanding force is applied perpendicular to the initial horizontal face plane thereof, whereby a multiplicity of ribbon-like sections are relatively displaced in depth to define air passage openings, but in such manner that said sections remain substantially parallel to the initial horizontal or face plane of the sheet, and are therefore disposed substantially perpendicular to the direction of air flow through the expanded sheet when the latter is incorporated in an air filter or cleaner device, and consequently the entire face areas of said sections are opposed to an air stream, subject to head on impingement of the latter thereupon, thus assuring maximum dust arresting effect, so that the dust entrapping and separating function of the viscous liquid coating, applied to the sheet in practice, is at a maximum.

The above and other objects will be understood from the following description of this invention when read in connection with the accompanying drawings, in which:

FIG. 6 is a fragmentary plan view of a slitted metallic or like sheet, showing the same being provided with transverse corrugate crimps extending across the strips bounded by the slits of the sheet, whereby to provide a modified form of filter medium; and FIG. 7 is a longitudinal sectional view, taken on line 7—7 in FIG. 6.

FIG. 8 is a fragmentary side elevational view of the transversely corrugately crimped slitted metallic or like sheet after expansion thereof to provide the modified form of filter medium; and FIG. 9 is a fragmentary transverse vertical sectional view of the same, taken on line 9—9 in FIG. 8.

Figure 1:
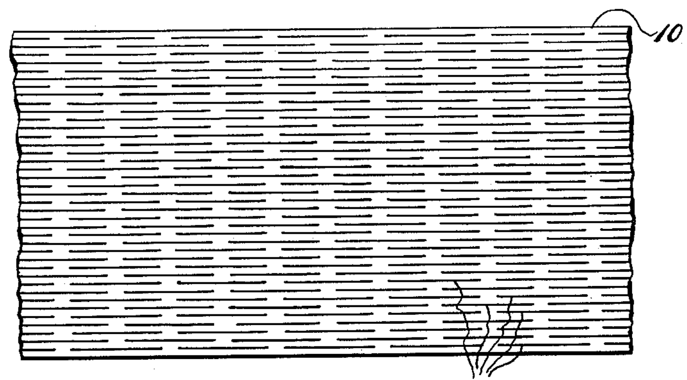
FIG. 1 is a plan view of one form of slitted metallic or like sheet ready for expansion to form a filter medium according to this invention.

Referring to the drawings, in which like characters of reference indicate corresponding parts, the reference character 10 indicates a flat sheet of metal or other suitable material, the same being of selected width and length. This sheet 10 is provided with laterally spaced, longitudinally extending rows of slits 11 of suitable length, and so arranged that the slits of alternate rows are disposed in uniformly staggered relation. The slitted sheet 10 preferably comprises metal foil, such as aluminum foil approximately .002 to .005 inch in thickness.

The base material corresponding to the slitted sheet 10 above described has heretofore been expanded by stretching the same horizontally in the direction of the width, much in the manner by which metal lath used as a building material has been produced; and sheets so expanded have been used in air filter or cleaner devices. Such laterally stretched expanded slitted sheets have not been altogether satisfactory as a filter medium, for the reasons already hereinabove given.

Figure 2:
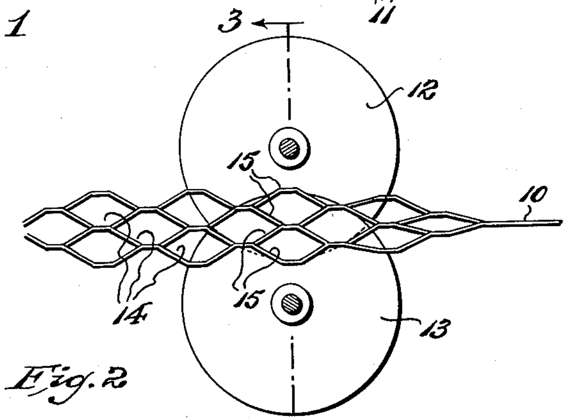
FIG. 2 is a side elevational view of means for expanding the slitted sheet to form the filter medium.
Figure 3:
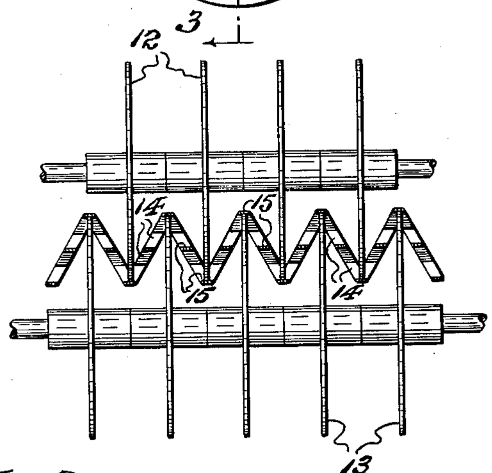
FIG. 3 is a transverse vertical sectional view, taken on line 3—3 in FIG. 2.

To provide the novel filter medium according to this invention, the slitted sheet 10 is not expanded by lateral stretching thereof in the direction of its horizontal face plane, but, quite the contrary, is expanded vertically, i.e. in a direction perpendicular to its horizontal face plane. Such vertical expansion of the slitted sheet 10 is obtained by passing the sheet flatwise and in the direction of its length between upper and lower groups of spaced expander discs 12 and 13; said groups being so relatively arranged that the discs 12 of the upper group are disposed in staggered relation to the discs 13 of the lower group a substantial distance; preferably e.g. in a lapping distance approximating ¾" to 1½" (see Figs. 2 and 3). The groups of discs are preferably so driven as to respectively rotate in opposite directions.

When the slitted sheet 10 is passed between and through the groups of expander discs 12 and 13, the upper discs 12 engage the top face of the slitted sheet between adjacent rows of slits, while the lower discs 13 engage the underface of the slitted sheet between other adjacent rows of slits. Such alternate engagement of the upper and lower expander discs with the slitted sheet occurs at suitably laterally spaced apart or separated portions of the latter, whereby one or more rows of slits intervene between adjacent upper and lower expander discs (preferably at least two, see FIG. 3). As the slitted sheet 10 progresses through the expander discs, the upper discs 12 exert downward thrust upon the portions of the slitted sheet engaged thereby, while the lower discs 13 simultaneously exert upward thrust upon the portions of the slitted sheet which they engage. As a result of such opposite thrusts, the slitted portions of the sheet 10 intermediate adjacent upper and lower discs 12 and 13 are expanded respectively downward and upward in direction angular to the horizonal face plane of the sheet, with the result that alternate ribbon-like strips or portions of the sheet material which are divided by the rows of slits are respectively spread apart and relatively displaced, so that one such strip or portion is upwardly bowed and another adjacent thereto is downwardly bowed, thereby to form intervening air passage openings 14 in the finished filter medium, while the face planes of the thus relatively displaced portions or strips remain disposed in planes substantially parallel to the initial horizontal face plane of the slitted sheet 10, and thus form a multiplicity of expanded portions having impingement surfaces 15 bordering said openings 14, which, when the filter medium is in use, are adapted to be disposed substantially perpendicular to the direction of air flow through said medium. As a consequence, the entire areas of said surfaces 15 can be opposed to the air stream, subject to substantially head on contact of said air stream therewith. By reason of this, maximum dust arresting effect is assured, resulting in separation of the dust from the air stream by entrapment of the dust by the viscous liquid coating with which the filter medium is supplied in air filter or cleaner use.

In the formation of the filter medium in the manner above described, the slitted sheet 10, by the expanding manipulation thereof, is formed with a plurality of longitudinally extending corrugations or folds, with but little reduction of the initial width of the slitted sheet 10. By reason of these corrugations or folds, each layer of the filter medium possesses a substantial overall thickness, which is of advantage when superposing a plurality of layers thereof in an air filter or cleaner device assembly, since a smaller number of layers can be used, and due to the disposition of the impingement surfaces substantially perpendicular to the direction of air stream flow, without reducing the efficiency of the device.

Figure 4:
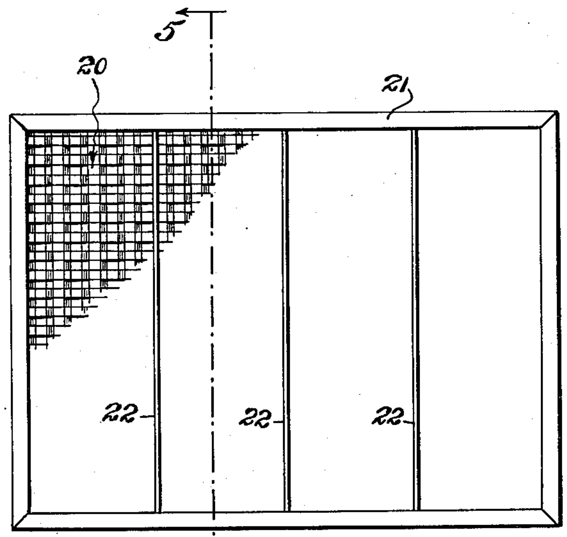
FIG. 4 is a schematic face elevational view of an air filter or cleaner device equipped with the filter medium according to this invention.
Figure 5:
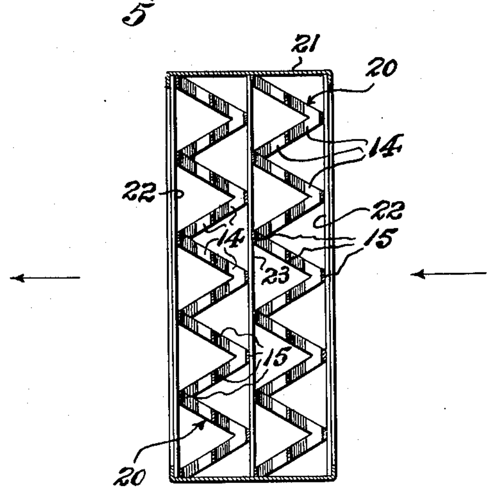
FIG. 5 is a longitudinal vertical sectional view through the same, taken on line 5—5 in FIG. 4.

In an air filter or cleaner as illustratively shown in FIGS. 4 and 5, the filter medium of this invention, which is indicated generally by the reference character 20 in these figures, comprises one or more layers of the media mounted within and across housing or frame 21 which is open from front to back. The medium is disposed in planes parallel to the open front and back of the housing or frame, and so that the impingement surfaces 15 thereof lie in corresponding planes, and thus substantially perpendicular to the direction of air flow through the housing or frame, said direction being indicated by the arrows shown in connection with FIG. 5. To prevent displacement of the filter medium layer or layers 20 outwardly from the open front and back of the housing or frame 21, the front and back openings may be closed by any suitable form of grating which is itself freely open to the movement of an air stream therethrough. Illustratively, a simple form of grating, as shown, may comprise a plurality of spaced apart grating rods 22 adapted to be affixed to and to extend between opposite walls of the housing or frame 21, and across the corrugations or folds of the filter medium. If more than one layer of filter medium is enclosed within the housing or frame 21, similar grating means can be similarly disposed between contiguous layers, whereby to hold the same in parallel relation and against nesting one into another, as e.g. intermediate grating rods 23 shown in FIG. 5.

The foregoing describes what may be characterized as a simple form of the expanded slitted metallic or like sheet adapted for use as a filter medium in an air filter or cleaner device.

Referring now to FIGS. 6 to 9 inclusive of the drawings, there is shown thereby a modified and preferable form of the filter medium for air cleaners and the like according to this invention, this modified medium having greatly increased viscous liquid holding capacity and consequently maximum efficiency in dust trapping effect. This modified form of the filter medium comprises a base material provided by a flat thin sheet 20 of metal or other suitable material, preferably aluminum foil approximating .002 to .005 of an inch in thickness, and of selected width and length. The sheet 20 is provided with laterally spaced, longitudinally extending rows of slits 21 of suitable length, and so arranged that the slits of alternate rows are disposed in uniformly staggered relation.

Before expanding the slitted sheet 20, the same is passed between opposed crimping rolls 22, whereby to provide the sheet with transverse corrugate crimps 23, which extend across the strips intermediate the slits 21 of the sheet (see FIGS. 6 and 7). These corrugate crimps are of small cross-sectional dimensions, approximately $\frac{3}{64}''$ to $\frac{1}{16}''$ in depth, and spaced approximately $\frac{1}{8}''$ apart.

After the slitted sheet 20 has been provided with the transverse corrugate crimps 23, the same is expanded vertically, i.e. in directions respectively downward and upward angularly to the initial horizontal plane of the sheet. Such downward and upward expansion of the slitted and crimped sheet 20 can be accomplished by the means and in the same manner as already hereinabove set forth with respect to the first described simple form of the filter medium of this invention, or by any other means operative to attain the described expanding effect. As a result of the expanding operation, alternate ribbon-like strips or portions of the transversely crimped sheet, which are separated by the rows of slits, 21, are upwardly and downwardly spread apart and thus relatively displaced, so that one is upwardly bowed and another adjacent thereto is downwardly bowed, thereby to form intervening air passages 24 which are bounded by such bowed portions or strips (see FIG. 8). It will be noted that the upwardly and downwardly bowed portions, although their transverse faces remain disposed in planes substantially parallel to the initial face planes of the sheet 20, are at the same time provided with the transverse crimps 23, the hollows or troughs of which form a multiplicity of pockets 25 (see FIG. 8) that are distributed throughout the extent of the formed filter medium. These pockets 25 are adapted to hold an amount of viscous liquid, which is applied to the filter medium in use, in much greater volume than can be held by the smooth surfaces of the non-crimped bowed portions of the hereinabove first described form of the filter medium. The pockets 25, when the filter medium is in use, are disposed substantially at a right angle to the direction of air flow through the medium, and therefore the content of viscous liquid held thereby is exposed to head on impingement therewith of dust particles carried by the air stream, which assures maximum dust entrapment effect thereof.

The expansion of laterally spaced apart sections of the slitted and crimped sheet, provides the later with a plurality of laterally spaced, longitudinally extending corrugations or folds 26 (see FIG. 9) of substantial depth. By reason of this, each layer of the completed filter medium possesses an overall thickness, which is of advantage when superposing a plurality of such layers in an air filter or cleaner device assembly, since a smaller number of layers can be used as compared with that required by prior art types of filter medium. In use the cross crimped expanded slitted sheet form of the filter medium is arranged in and across the frame of an air cleaner device (see FIGS. 4 and 5) substantially in the same manner as set forth with respect to the first described non-crimped form of the filter medium.

The following are some advantages of the cross crimped expanded slitted sheet form of the filter medium of this invention:

(1) The cross crimped, expanded slitted sheet form of the filter medium provides approximately 20% more air impingement surface area per square foot than does the uncrimped expanded slitted sheet form.

(2) The cross crimped, expanded slitted sheet form of the filter medium will induce greater turbulence in an air stream traversing the same, which is an advantage in a viscous liquid coated medium, since it causes a more efficient direction of dust laden air toward the contained viscous liquid, with consequent maximum dust trapping effect.

(3) The cross crimped slitted sheet having slit lengths approximating those of the uncrimped slitted sheet, when expanded will form air passages 24 of smaller area, since the sides of the passages are shortened by the crimps approximately 20%. This assures more intimate contact of the dust laden air stream traversing the medium with viscous liquid supported by the crimped passage sides.

(4) The filter medium produced from the cross crimped expanded slitted sheet, on test, was found to hold four times as much viscous liquid as does a filter medium produced from an uncrimped expanded slitted sheet.

This was demonstrated by a test made with 40 OW oil. Both the crimped and uncrimped expanded slitted sheets were immersed in the oil and suspended for 17 hours. The uncrimped expanded slitted sheet retained 6.12 gram of oil per square foot of projected area, whereas the crimped expanded slitted sheet retained 25.61 grams of oil per square foot of projected area.

(5) In the filter medium produced from the cross crimped expanded slitted sheet, the presence of the crimps across the bowed portions of the medium makes for better stability of the medium, since said cross crimps tend to rigidize the structure.

Although I have described the slitted sheet material expanded by the method of this invention as especially well adapted for use as a filter medium for air cleaners, by so doing I do not intend to limit said expanded sheet material to such use, since per se it is believed equally well adapted for many other uses.

Having now described my invention, I claim:

1. A filter medium for removing solid particles from a gaseous stream passing therethrough comprising sheet material having longitudinally extending, laterally spaced rows of slits so arranged that slits of alternate rows are disposed in staggered relation, thereby to provide rows of separate ribbon-like strips between rows of said slits, strips of certain rows thereof being bowed downward while strips of alternate rows thereof are bowed upward relative to the face planes of the sheet material, thereby providing the medium with openings defined by the bowed strips, the bowed strips having their face planes disposed substantially parallel to the face planes of the sheet material, whereby faces of said strips which are opposed to a gaseous stream passing through the medium are presented to the stream for substantially head-on contact thereby, and said bowed strips being provided with transverse crimps along the lengths thereof which are adapted to form pockets to hold a content of coating liquid applied to the medium in use.

2. A filter medium according to claim 1, wherein the sheet material comprises a metal foil approximating .002 to .005 inch in thickness.

3. A filter medium for removing solid particles from a gaseous stream passing therethrough comprising transversely crimped sheet material having longitudinally extending, laterally spaced rows of slits traversing its crimps, said slits being so arranged that the slits of alternate rows thereof are disposed in staggered relation, thereby to provide rows of separate transversely crimped ribbon-like strips between rows of said slits, strips of certain rows thereof being bowed downward while strips of the other rows thereof are bowed upward relative to the face planes of the sheet material, thereby providing the medium with openings defined by the bowed strips, the crimps of the bowed strips providing a plurality of pockets along the lengths thereof adapted to hold a relatively large volume of coating liquid applied to the medium in use, and the crimped bowed strips having their pocketed face planes disposed substantially parallel to the face planes of the medium, whereby pocketed faces of said strips which are opposed to a gaseous stream passed through the medium are presented to the stream for substantially head on contact thereby.

4. A filter medium for removing solid particles from a gaseous stream passing therethrough comprising transversely crimped sheet material having longitudinally extending, laterally spaced rows of slits traversing its crimps, said slits being so arranged that the slits of alternate rows thereof are disposed in staggered relation, thereby to provide rows of separate transversely crimped ribbon-like strips between rows of said slits, spaced apart strips of certain rows thereof being bowed downward while strips of intermediate adjacent rows thereof are bowed upward relative to the face planes of the sheet material, said spaced apart and intermediate rows of strips forming longitudinally extending folds in the sheet material, said folds having openings in the sides thereof defined by the downwardly and upwardly bowed strips, the crimps of the bowed strips providing a plurality of pockets along the lengths thereof adapted to hold a relatively large volume of coating liquid applied to the medium in use, and the crimped bowed strips having their pocketed face planes disposed substantially parallel to the face planes of the medium, whereby pocketed faces of said strips which are opposed to a gaseous stream passed through the medium are presented to the stream for substantially head on contact thereby.

5. A filter medium according to claim 4, wherein the sheet material comprises a metal foil approximating .002 to .005 inch in thickness.

References Cited in the file of this patent

UNITED STATES PATENTS

| | | |
|---|---|---|
| 1,268,903 | White | June 11, 1918 |
| 1,437,746 | Clark | Dec. 5, 1922 |
| 1,566,088 | Greene | Dec. 15, 1925 |
| 1,593,960 | White | July 27, 1926 |
| 1,890,173 | Baker | Dec. 6, 1932 |
| 1,941,450 | Syvan | Jan. 2, 1934 |
| 2,344,384 | Altenkirk | Mar. 14, 1944 |
| 2,471,548 | Schaaf | May 31, 1949 |
| 2,486,728 | Asad | Nov. 1, 1949 |
| 2,493,726 | O'Day | Jan. 3, 1950 |
| 2,602,521 | Smith | July 8, 1952 |
| 2,754,928 | Hambrecht et al. | July 17, 1956 |

FOREIGN PATENTS

| | | |
|---|---|---|
| 99,204 | Germany | Oct. 10, 1898 |